United States Patent
Frömel

[11] 3,819,477
[45] June 25, 1974

[54] SPACER FOR FUEL RODS OF NUCLEAR LIGHT-WATER REACTORS

[75] Inventor: Gustav Frömel, Erlangen, Germany

[73] Assignee: Siemens Aktiengesellschaft, Munich, Germany

[22] Filed: Dec. 6, 1972

[21] Appl. No.: 312,510

[30] Foreign Application Priority Data
Dec. 10, 1971  Germany............................ 2161229

[52] U.S. Cl..................................... 176/76, 176/78
[51] Int. Cl............................ G21c 3/34, G21c 3/30
[58] Field of Search................................. 176/76, 78

[56] References Cited
UNITED STATES PATENTS

| | | | |
|---|---|---|---|
| 3,379,619 | 4/1968 | Andrews........................... | 176/76 X |
| 3,457,140 | 7/1969 | Glandin.............................. | 176/78 |
| 3,475,273 | 10/1969 | Krawiec.............................. | 176/78 |
| 3,510,397 | 5/1970 | Zettervall............................. | 176/78 |
| 3,654,077 | 4/1972 | Lass et al............................. | 176/78 |
| 3,679,546 | 7/1972 | Muellner et al. ..................... | 176/78 |

*Primary Examiner*—Benjamin R. Padgett
*Assistant Examiner*—Roger B. Gaither
*Attorney, Agent, or Firm*—Kenyon & Kenyon Reilly Carr & Chapin

[57] ABSTRACT

The spacer consists of two grid elements arranged in parallel to one another and spaced apart at a distance; leaf springs for the fuel rods; and spacer bushings which extend between the two grid elements in positions provided for control rod guide tubes. Each spacer bushing encloses an associated control rod guide tube. The spacer bushing is connected with the grid elements and also with the associated control rod guide tube at at least one point, preferably by spot welding.

9 Claims, 1 Drawing Figure

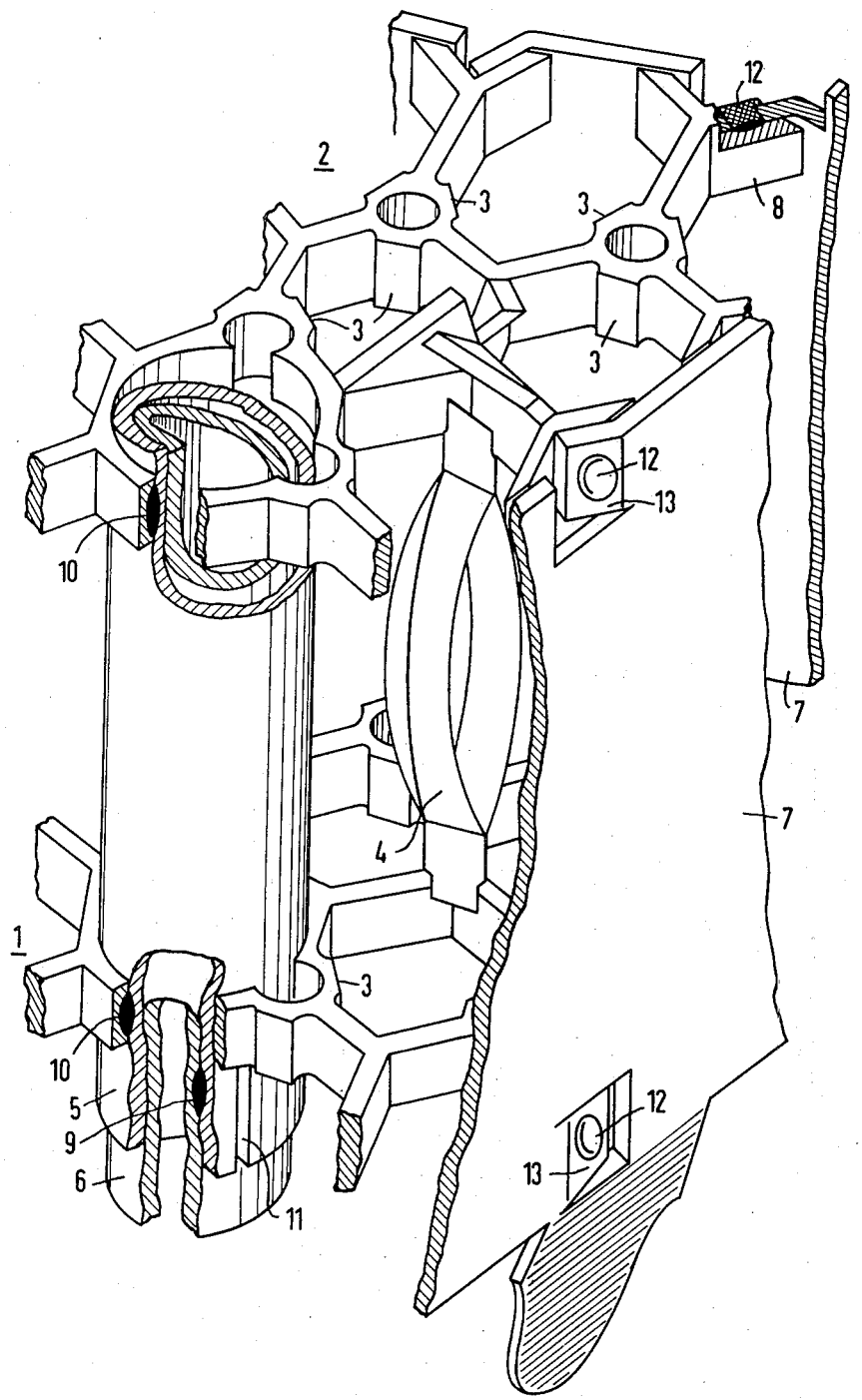

SPACER FOR FUEL RODS OF NUCLEAR LIGHT-WATER REACTORS

BACKGROUND OF THE INVENTION

1. Field of the Invention

The field of this invention relates to light-water reactors and more particularly to spacers for the fuel rods of such nuclear light-water reactors.

2. Description of the Prior Art

Spacers for fuel rods in a nuclear light-water reactor are already known in which the distance between the parallel grid elements is determined solely by the leaf spring situated between them. If forces act upon the springs, the forces are transmitted to the associated grid elements and, as a result, the spacing between the associated grid elements may change. Furthermore, undesirable deformations may result in the grid elements (see German design Pat. No. 7,032,434).

SUMMARY OF THE INVENTION

The object of this invention is to provide a spacer for fuel rods in a nuclear light-water reactor in which the spacing of the grid elements remains constant, independent of the influence of the leaf springs, and in which the influence of the force transmitted by the springs on the grid elements is largely eliminated.

The spacer of this invention provides a solution to this problem in the form of a spacer for fuel rods of a nuclear light-water reactor which consists of two grid elements which are arranged in parallel and spaced apart at a distance, the grid elements being designed to accept fuel rods and having webs, the inside of the webs being provided with fixed contact points for the fuel rods; leaf springs with several legs which serve as resilient contact points for the fuel rods, the ends of the springs being braced against the webs of the associated grid elements; and spacer bushings which extend between the grid elements in the positions provided for control rod guide tubes, each spacer bushing enclosing the associated control rod guide tube, the spacer bushing being connected to the grid elements and each spacer bushing being connected to its associated control rod guide tube at at least one point.

A particularly strong connection between the grid elements is achieved by the provision of a retainer casing which surrounds the grid elements and which is connected to the outer webs of the grid elements. In a suitable embodiment of this invention the spacer bushings consist of a neutron-transparent material and extend beyond at least one grid element. The joint between each spacer bushing and the associated control rod guide tube is located in the area of the spacer bushing which extends beyond the grid element.

Another suitable embodiment of this invention includes the provision that the joints between the bushings and the grid elements and the joints between the bushings and the control rod guide tubes enclosed by the spacer bushings consist of welds, preferably spot welds. In addition, the ends of the spacer bushings have axial slots extending up to the inner surface of the associated grid elements. The slots thereby divide the ends of the spacer bushings into segments. Each of the segments between the slots can be bent outwardly for the purpose of compensating for tolerances. Each segment has only one weld in such a manner that one segment has a weld between the control rod guide tube and the spacer bushing and another segment has a weld between the spacer bushing and the web of the associated grid element.

To connect the retainer casing with the outer webs of the grid element, a rivet is placed through the retainer casing at each connection with the grid element. The rivet has an inwardly-pointing end face which is flush with the inside surface of the retainer casing and is connected to the associated outer web of the grid, for instance, by spot welding. Tongues in the retainer casing carry the rivets and can be bent inwardly from the retainer casing at each joint.

DESCRIPTION OF THE DRAWING

FIG. 1 is a simplified isometric view of a spacer of this invention having certain portions cut away to reveal interior components.

DETAILED DESCRIPTION

Referring to FIG. 1, the spacer of this invention for fuel rods of nuclear light-water reactors includes two grid elements 1 and 2 which are arranged in parallel to one another and spaced apart at a distance. The grid elements 1 and 2 may be made of Zircaloy strip or they may consist of Zircaloy plates which have been given their shape by appropriate machining, such as by spark erosion. The grid elements 1 and 2 are designed to accept fuel rods (not shown) and fixed contact points 3 for the fuel rods are provided in the inside of the webs of the grid elements 1 and 2. For ease of insertion of the fuel rods, the contact points 3 may be chamfered at the edges in the push direction (not shown). The webs of the grid elements 1 and 2 carry the mixing vanes in the usual manner or they are themselves designed as such. In the region of the web adjacent to the openings of the grid elements 1 and 2, there are cutouts provided which allow the coolant to pass through.

Leaf springs 4 extend between the grid elements 1 and 2. The leaf springs 4 have several legs which serve as resilient contact points for the fuel rods. The ends of the leaf springs 4 are braced against the webs of the grid elements 1 and 2. The number of legs of the leaf springs 4 is determined by the geometry of the grid elements 1 and 2 which may be designed for a triangular, rectangular, hexagonal or polygonal arrangement of the fuel rods (not shown).

Spacer bushings 5 extend between the grid elements 1 and 2 in positions provided for control rod guide tubes 6 within the grid elements 1 and 2. Each spacer bushing 5 encloses a control rod guide tube 6. The spacer bushings are connected to the grid elements 1 and 2 and each spacer bushing 5 is connected to its associated control rod guide tube 6 at at least one point. The spacer bushings 5 and the grid elements 1 and 2 consist of a neutron-transparent material and the spacer bushings 5 protrude beyond at least one grid element 1 or 2. A retainer casing 7 surrounds both grid elements 1 and 2 and is connected to the outer webs 8 of the grid elements 1 and 2.

The grid elements 1 and 2 are made of the same material. There is a joint 10 which provides the connection between each spacer bushing 5 and the associated grid elements 1 and 2. This joint 10 is a weld and preferably a spot weld. There is also a joint 9 between each spacer bushing 5 and its associated control rod guide tube 6 and this joint 9 is in the area of the spacer bushing 5 which protrudes beyond the grid elements 1 and 2. This joint 9 is a weld and preferably a spot weld.

In order to provide compensation for tolerances between the spacer bushings 5 and the openings of the grid elements 1 and 2, the ends of the spacer bushings 5 have axial slots 11 extending at least to the inner surfaces of the associated grid elements 1 and 2. The slots 11 thereby divide the ends of the spacer bushings 5 into segments. The segments between the slots 11 are bent outwardly in order to be fitted to the openings of the grid elements 1 and 2 and thereby compensate for tolerances. Each segment has only one weld whereby one segment has a weld 9 between the control rod guide tube 6 and the spacer bushing 5 and the next alternating segment has a weld 10 between the spacer bushing 5 and the web of the associated grid elements 1 or 2.

In order to connect the retainer casing 7 with the outer webs 8 of the grid elements 1 or 2, the retainer casing 7 is pierced at each connection to the outer web 8 of the grid elements 1 and 2 by a rivet 12. The inwardly-pointing end face of rivet 12 is flush with the inside surface of the retainer casing and the rivet is connected to the associated outer web 8, for instance, by spot welding.

The retainer casing 7 has a tongue 13 at each point where the retainer casing 7 is connected to the outer web 8 of the grid elements 1 or 2. The tongue 13 is formed by cuts in the retainer casing 7 which cuts are perpendicular to one another. Each tongue 13 carries a rivet 12 and the tongues 13 are bent inwardly from the retainer casing 7 so that the rivet heads do not protrude beyond the retainer casing 7. This serves not only for spacing the grid elements 1 or 2 but also for delineation from adjacent spacers or fuel elements.

For the grid elements, materials of Zircaloy or the like are used. Only the leaf springs serving as contact points for the fuel rods, consist, as a rule, of spring steel.

What is claimed is:

1. A spacer for fuel rods of nuclear light-water reactors, comprising:
   a. two grid elements which are arranged parallel to one another and spaced apart at a distance from one another, said grid elements being designed to accept fuel rods and having webs, the inside of said webs being provided with fixed contact points for the fuel rods;
   b. leaf springs extending between said grid elements, said leaf springs having several legs which serve as resilient contact points for the fuel rods, the ends of said leaf springs being braced against the webs of the associated grid elements; and
   c. spacer bushings extending between said grid elements in positions provided for control rod guide tubes within said grid elements, each said spacer bushing enclosing the associated control rod guide tube, said spacer bushings being connected to the grid elements and each said spacer bushing being connected to its associated control rod guide tube at at least one point.

2. The spacer according to claim 1 and further comprising a retainer casing which surrounds the grid elements and which is connected to the outer webs of the grid elements.

3. The spacer according to claim 1 and further comprising a joint between each said spacer bushing and said grid elements and a joint between each said spacer bushing and its associated control rod guide tube.

4. The spacer according to claim 3 wherein said joints are spot welds.

5. The spacer according to claim 3 wherein the spacer bushings consist of a neutron-transparent material and protrude beyond at least one grid element, said joint between said spacer bushing and said associated control rod guide tube being located in the area of said spacer bushing which protrudes beyond the grid element.

6. The spacer according to claim 1 wherein the ends of said spacer bushings have axial slots extending to the inner surfaces of the associated grid element, said slots thereby dividing the ends of the spacer bushings into segments, each segment between said slots being bent outwardly in order to compensate for tolerances, each segment having only one weld whereby one segment has a weld between said control rod guide tube and said spacer bushing and another segment has a weld between said spacer bushing and said web of the associated grid element.

7. The spacer according to claim 2 wherein the retainer casing is pierced at each connection to the outer web of the grid elements by a rivet, the inwardly-pointing end face of said rivet being flush with the inside surface of said retainer casing and said rivet being connected to the associated outer web by a weld.

8. The spacer according to claim 7 wherein the retainer casing has tongues, each of said tongues carrying a rivet, said tongues being bent inwardly from the retainer casing.

9. A nuclear reactor fuel rod and control rod guide tube interspacing assembly including mutually parallel grids which are transversely interspaced and have mutually registered openings which are laterally interspaced for receiving and laterally interspacing the fuel rods and the control rod guide tubes, and leaf springs positioned between said grids and having opposite ends butted against the mutually opposite sides of the grids with the springs elastically sprung apart to laterally engage rods extending between the grids and normally fixing the grid's transverse interspacing; wherein the improvement comprises at least one elongated bushing extending between said grids and with portions positioned in mutually registered ones of said control rod guide tube openings, said bushing being connected to said grids to positively fix the latter's said transverse interspacing independently of said leaf springs, and said bushing being made of neutron-transparent material and constructed to receive a control rod guide tube therein.

* * * * *